(12) United States Patent
Smith

(10) Patent No.: US 6,885,363 B2
(45) Date of Patent: Apr. 26, 2005

(54) POINTING DEVICE DWELL TIME

(75) Inventor: Kim C. Smith, Dove Canyon, CA (US)

(73) Assignee: Gateway, Inc., Irvine, CA (US)

( * ) Notice: Subject to any disclaimer, the term of this patent is extended or adjusted under 35 U.S.C. 154(b) by 532 days.

(21) Appl. No.: 10/142,094

(22) Filed: May 9, 2002

(65) Prior Publication Data

US 2003/0210227 A1 Nov. 13, 2003

(51) Int. Cl.[7] .............................................. G09G 5/08
(52) U.S. Cl. ................ 345/157; 345/156; 345/158; 345/159; 345/163; 345/764; 345/765; 345/814; 345/855; 345/862; 345/207
(58) Field of Search ............................. 345/156, 157, 345/158, 159, 163, 207, 764–765, 814, 855, 862, 856, 859, 861

(56) References Cited

U.S. PATENT DOCUMENTS

| | | | |
|---|---|---|---|
| 5,459,831 A | 10/1995 | Brewer et al. | 345/853 |
| 5,911,036 A | 6/1999 | Wright | 395/94 |
| 5,969,708 A | 10/1999 | Walls | 345/145 |
| 6,160,536 A | 12/2000 | Forest | 345/157 |
| 6,204,828 B1 | 3/2001 | Amir et al. | 345/7 |
| 6,392,675 B1 | 5/2002 | Becker et al. | 345/858 |
| 2002/0075333 A1 | 6/2002 | Dutta et al. | 345/862 |

OTHER PUBLICATIONS

Http://www.naturalpoint.com/prod/at_product.htm.
Http://www.boosttechnology.com/tracer_description.html.

*Primary Examiner*—Richard Hjerpe
*Assistant Examiner*—Faranak Fouladi

(57) ABSTRACT

A method, apparatus, and signal-bearing medium that selects an object displayed on a display screen when a cursor controlled by a pointing device pauses at the object for a time period longer than a dwell-time threshold. The dwell-time threshold is adjusted based on the density of the objects displayed on the screen. Thus, when the density of displayed objects is higher, the dwell-time threshold is longer and the user must hold the cursor at the desired object for a longer time in order to select the object. Similarly, when the density of displayed objects is lower, the dwell-time threshold is lower, and the user must hold the cursor at the desired object for a shorter time in order to select the object.

21 Claims, 5 Drawing Sheets

POINTING DEVICE DWELL TIME

FIELD

This invention relates generally to pointing devices and more particularly to the dwell time of a pointing device.

BACKGROUND

Many modern computers have a graphical user interface where the user operates a pointing device to move a pointer or cursor and to select target objects on a video display screen. A mouse is the most popular pointing device, but there are others, such as a trackball, touch pad, touchscreen, or joystick. But, all of these pointing devices require the user to use the hand or finger to press or click a physical or virtual button in order to select a target object (e.g. an icon, button, slider, link, or other object) on the screen. Some users have difficulty with this pressing operation because they have a physical disability that hampers their hand or finger motion or because their hands are otherwise occupied, such as a surgeon in an operating room.

To address this problem, hands-free pointing devices are available that may be mounted on a part of the body that the user is able to control, such as the head. The computer detects the position of the hands-free pointing device and when the head moves, the computer moves the associated cursor on the screen. The computer performs a selection operation (analogous to clicking a mouse) when the computer detects that the cursor has paused or dwelled on a target object for a specified time.

Unfortunately, if the specified time is set to be too short, users experience frustration by unintentionally selecting screen objects. Similarly, if the specified time is set to be too long, users experience frustration by being forced to maintain a steady head position directed at an object for a long time in order to select it.

SUMMARY

A method, apparatus, and signal-bearing medium is provided that selects an object displayed on a display screen when a cursor controlled by a pointing device pauses at the object for a time period longer than a dwell-time threshold. The dwell-time threshold is adjusted based on the density of the objects displayed on the screen. Thus, when the density of displayed objects is higher, the dwell-time threshold is longer and the user must hold the cursor at the desired object for a longer time in order to select the object. Similarly, when the density of displayed objects is lower, the dwell-time threshold is lower, and the user must hold the cursor at the desired object for a shorter time in order to select the object.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Figure 1:
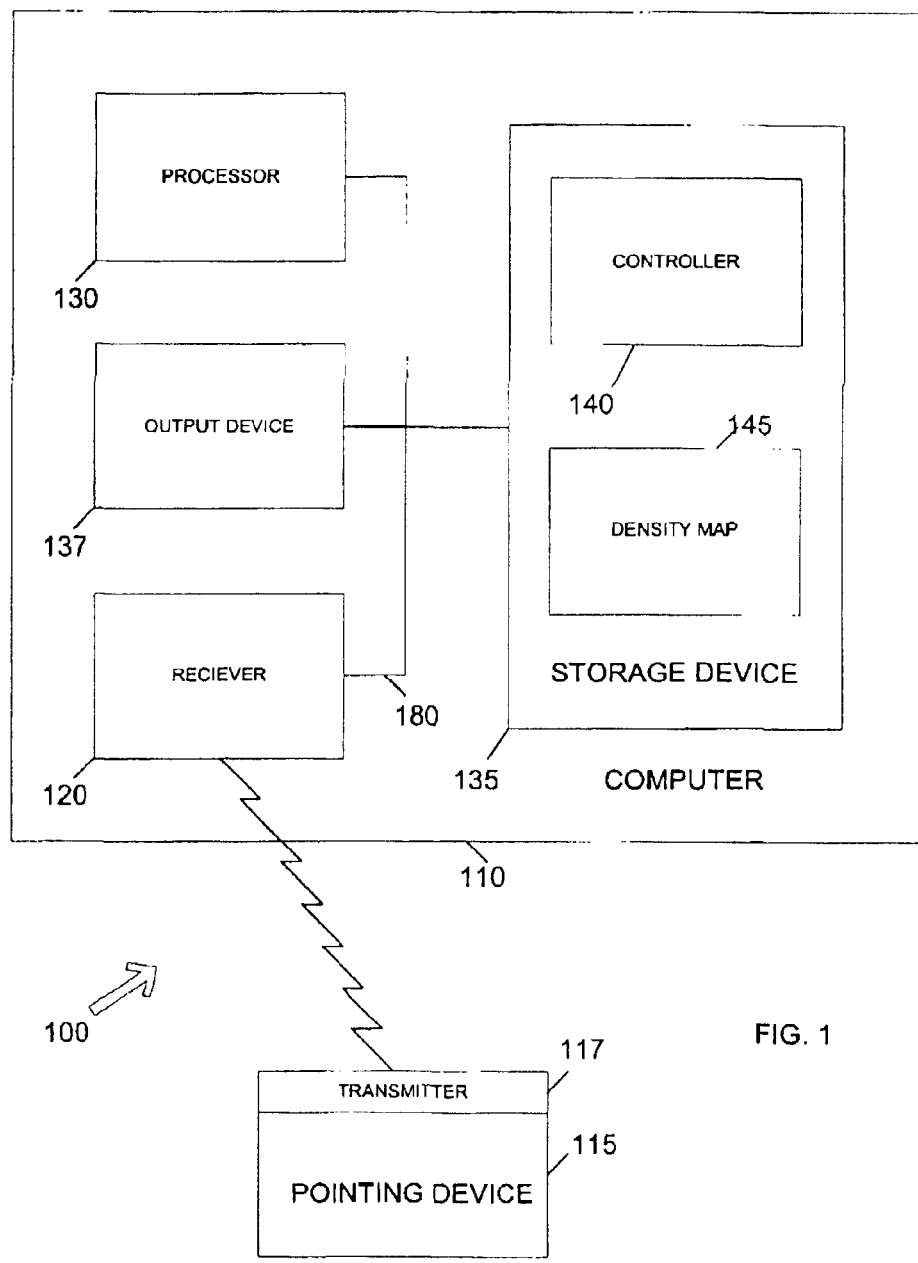
FIG. 1 depicts a block diagram of a system for implementing an embodiment of the invention.

FIG. 1 depicts a block diagram of a system 100 for implementing an embodiment of the invention. The system 100 may include a computer 110 in communication with a pointing device 115. Computer 110 may include a receiver 120, a processor 130, a storage device 135, and an output device 137, all connected via a bus 180.

The receiver 120 may be capable of receiving signals from the pointing device 115. In various embodiments, the receiver 120 may be a camera, an IR (infrared) receiver, an RF (radio frequency) receiver, a serial or parallel bus adapter, or any other device capable of receiving information regarding the position and/or the motion of the pointing device 115.

The processor 130 may represent a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 130 may execute instructions and may include that portion of the computer 110 that controls the operation of the entire computer. Although not depicted in FIG. 1, the processor 130 typically includes a control unit that organizes data and program storage in memory and transfers data and other information between the various parts of the computer 110. The processor 130 may receive input data from the pointing device 115, may read and store code and data from/to the storage device 135, and may present data on the output device 137.

Although the computer 110 is shown to contain only a single processor 130 and a single bus 180, the present invention applies equally to computers that may have multiple processors and to computers that may have multiple buses with some or all performing different functions in different ways.

The storage device 135 represents one or more mechanisms for storing data. For example, the storage device 135 may include read only memory (ROM), random access memory (RAM), magnetic disk storage media, optical storage media, flash memory devices, and/or other machine-readable media. In other embodiments, any appropriate type of storage device may be used. Although only one storage device 135 is shown, multiple storage devices and multiple types of storage devices may be present. Further, although the computer 110 is drawn to contain the storage device 135, it may be distributed across other computers.

The storage device 135 may include a controller 140 and a density map 145. Of course, the storage device 135 may also include additional software and data (not shown), which is not necessary to understanding the invention.

The controller 140 may include instructions capable of being executed by the processor 130 to carry out the functions of an embodiment of the present invention, as further described below with reference to FIG. 5. In the alternative, the controller 140 may be implemented by control circuitry though the use of logic gates, programmable logic devices, or other hardware components in lieu of a processor-based system. The controller 140 may receive information from pointing device 115 via receiver 120 and may move a pointer or cursor on the output device 137 in response to this information. In an embodiment, the controller 140 may respond to interrupts that contain packets of positional information about the pointing device 115, may delete the pointer at the current location on the display 137, may write the old screen contents at this location, may read and save the screen contents at the new location, and may overwrite the new location with the pointer. The controller 140 may also detect when the pointer is at a position that is over or is within a specified distance from a screen object and may select the object when the pointer stays over the object or within the specified distance from the object for more than the dwell-time threshold. Selecting the object may include executing a program associated with the object, opening a file associated with the object, highlighting the object on the screen, sending a button click event to an entity associated with the object, retrieving a web page associated with the object, or any other object operation.

The density map 145 may include information about the density of objects in a region or regions displayed on the output device 137, as further described below with reference to FIG. 4.

The output device 137 is that part of the computer 110 that displays output to the user. The output device 137 may be a cathode-ray tube (CRT) based video display well known in the art of computer hardware. But, in other embodiments the output device 137 may be replaced with a liquid crystal display (LCD) based or gas, plasma-based, flat-panel display. In still other embodiments, any appropriate display device may be used. Although only one output device 137 is shown, in other embodiments, any number of output devices of different types or of the same type may be present. The output device 137 is capable of displaying target objects and a cursor or pointer. The target objects may be web links, icons, sliders, buttons, dials, or any other object capable of being displayed on the output device 137 and selected.

The bus 180 may represent one or more busses, e.g., PCI, ISA (Industry Standard Architecture), X-Bus, EISA (Extended Industry Standard Architecture), or any other appropriate bus and/or bridge (also called a bus controller).

The computer 110 may be implemented using any suitable hardware and/or software, such as a personal computer or other electronic computing device. Portable computers, laptop or notebook computers, PDAs (Personal Digital Assistants), two-way alphanumeric pagers, keypads, portable telephones, pocket computers, and mainframe computers are examples of other possible configurations of the computer 110. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted. Thus, an embodiment of the invention may apply to any hardware configuration that supports a pointing device.

In an embodiment, the pointing device 115 may include a transmitter 117 for transmitting position information to the receiver 120. In another embodiment the transmitter 117 may not be present. In an embodiment, the pointing device 115 may be a reflective dot placed on the forehead (or other mobile anatomical portion) of a user that may be monitored by a camera or IR (infrared) device. In another embodiment, the pointing device 115 may communicate to the computer 110 via RF (radio frequency). In another embodiment, the pointing device 115 may communicate to the computer via visible light. In another embodiment, the pointing device 115 may be a trackIR hands-free mouse available from NaturalPoint, Inc. In another embodiment, the pointing device 115 may be a Tracer mouse available from Boost Technology. In an embodiment, the pointing device 115 may be mounted on the head, finger, hand, foot, or any other appropriate mobile portion of the user's body. Although the pointing device 115 is shown as being in wireless communication with the computer 110, in another embodiment they are hardwired together. In another embodiment, the pointing device 115 may be a mouse, trackball, joystick, foot pedal, or any other device that is capable of indicating a position and/or motion to the computer 110.

As will be described in detail below, aspects of an embodiment pertain to specific apparatus and method elements implementable on an electronic device. In another embodiment, the invention may be implemented as a program product for use with an electronic device. The programs defining the functions of this embodiment may be delivered to an electronic device via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, including wireless communications.

Such signal-bearing media, when carrying machine-readable instructions that direct the functions of the present invention, represent embodiments of the present invention.

Figure 2:
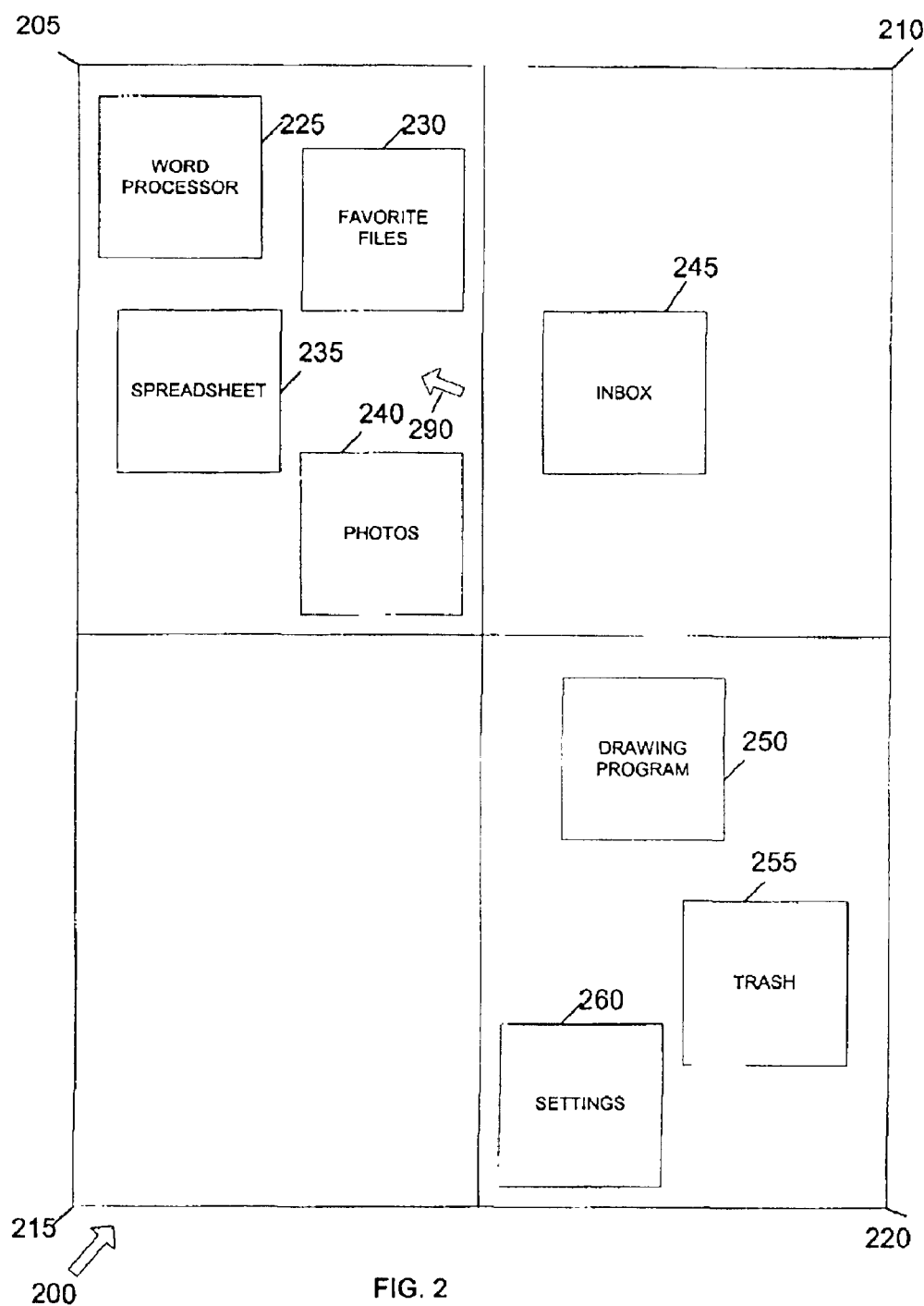
FIG. 2 depicts a pictorial representation of a user interface with regions, according to an embodiment of the invention.

FIG. 2 depicts a pictorial representation of an example user interface 200 with regions, according to an embodiment of the invention. The example user interface 200 may be displayed on a display screen of the output device 137 and may include objects 225, 230, 235, 240, 245, 250, 255, and 260, which are examples only, and any appropriate objects may be used. The example user interface 200 may also include pointer or cursor 290.

The example user interface 200 may be divided into regions 205, 210, 215, and 220 with region 205 including objects 225, 230, 235, and 240; region 210 including object 245; region 215 including zero objects; and region 220 including objects 250, 255, and 260; but in other embodiments each region may include any number of objects. Although in this example the user interface 200 includes four regions of equal size and shape, in other embodiments the user interface may include any number of regions of varying sizes and shapes. Although the objects shown are icons representing programs or files, in other embodiments web links, words, drawings, buttons, dials, sliders, or any other selectable displayed objects may be used. Although regions 205, 210, 215, and 220 are shown separated by lines displayed on output device 137, in another embodiment the separating lines may not be present.

In the embodiment shown, the controller 140 has divided the number of objects (8) by a predetermined constant (2) to yield 4 regions: 205, 210, 215 and 220. But, in other embodiments, the controller 140 may determine the number of the regions based on the number of the displayed objects, the size of the displayed objects, the size of the screen on the output device 137, a user preference, or any combination of these or other factors.

The controller 140 may determine the density of objects in each of the regions 205, 210, 215, and 220 and create a density map 145, as further described below with respect to FIGS. 4 and 5. In an embodiment where the regions are of equal size, the density of each region may be the number of objects within the region, for example, four in region 205, one in region 210, zero in region 215, and three in region 220. But in embodiments where the regions are of unequal size, the density may be expressed in number of objects per pixel, number of objects per square inch, number of objects per square centimeter, or any other appropriate units.

The controller 140 adjusts the dwell-time threshold based on the density of the region. In the example shown, region 205 has a relatively high density of objects (4) while region 210 has a relatively low density of objects (1). Thus, when the cursor 290 is in region 205, the controller 140 may adjust the dwell-time threshold to be relatively high, so that the user must keep the cursor over or near a desired object for a relatively long time before the controller 140 selects it. In contrast, when the cursor 290 is in region 210, the controller 140 may adjusts the dwell-time threshold to be relatively low, so that the user need only keep the cursor over or near object 245 for a relatively short time before the controller 140 selects it. By varying the dwell-time threshold, the user is protected from selecting an unintended object in regions where the object density is relatively high, but the user can also quickly select objects in regions where the object density is relatively low. The actions of the controller 140 are further described below with reference to FIG. 5.

Figure 3:
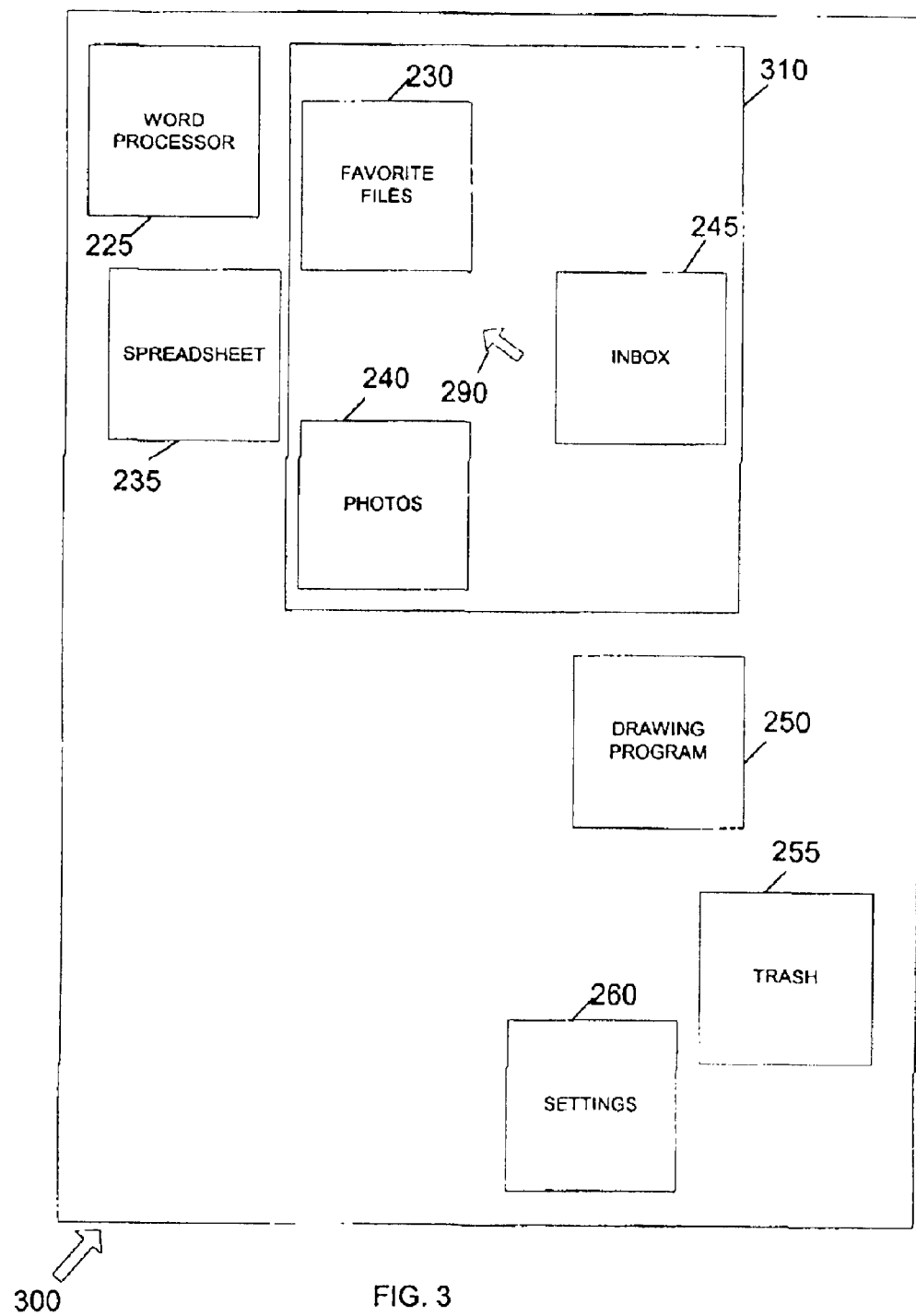
FIG. 3 depicts a pictorial representation of a user interface with a region, according to an embodiment of the invention.

FIG. 3 depicts a pictorial representation of an example user interface 300 with one region, according to an embodiment of the invention. The example user interface 300 is displayed on the output device 137 and includes objects 225, 230, 235, 240, 245, 250, 255, and 260. The region 310 encompasses objects 230, 240, and 245. Although in this example the region 310 is rectangular in shape, a circular region or any other appropriate type of shape may be used in other embodiments. Although the objects shown are icons representing programs or files, in other embodiments web links, words, drawings, buttons, dials, sliders, or any other selectable displayed objects may be used. Although the boundaries of the region 310 are illustrated by a rectangular box, in another embodiment the rectangular box may not be displayed on the output device 137.

In the embodiment shown, the controller 140 determines the location of the cursor 290 and creates the region 310 to surround the cursor 290. In an embodiment, the size of the region 310 may be a predetermined constant. In another embodiment, the size of the region 310 may be user selected. In another embodiment, the controller 140 may dynamically determine the size of the region 310 based on the number of displayed objects, the size of the screen in the output device 137, the density of the displayed objects within the entire screen, or any combination of these or other factors.

The controller 140 may determine the density of objects in the region 310 and create a density map 145, as further described below with respect to FIGS. 4 and 5. In an embodiment, the density of region 310 may be the number of objects within the region (three in the example shown). But in embodiments, the density may be expressed in terms of number of objects per pixel, number of objects per square inch, number of objects per square centimeter, or any other appropriate units.

The controller 140 may adjust the dwell-time threshold based on the density of the region 310. In the example shown, region 310 includes three objects, but when the user moves the pointing device 115 (and thus the controller 140 moves the cursor 290 on the screen), the controller 140 also moves the region 310 to contain a different set of objects, so the region may have a higher or lower density. Thus, when the region 310 has a relatively high density, the controller 140 adjusts the dwell-time threshold to be relatively high, so that the user must keep the cursor over or near a desired object for a relatively long time before the controller 140 selects it. In contrast, when the region 310 has a relatively low density, the controller 140 adjusts the dwell-time threshold to be relatively low, so that the user need only keep the cursor over or near a desired object for a relatively short time before the controller 140 selects it. In another embodiment, when an online article contains adjacent links, e.g. in adjacent lines, the controller adjusts the dwell-time threshold to the maximum. The actions of the controller 140 are further described below with reference to FIG. 5.

Figure 4:
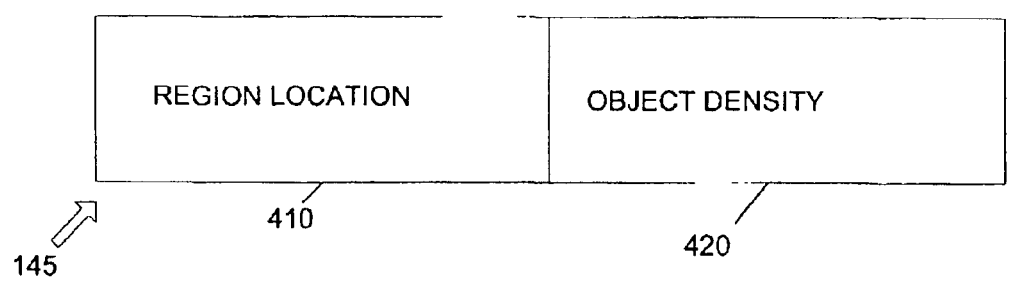
FIG. 4 depicts a block diagram of a density map data structure, according to an embodiment of the invention.

FIG. 4 depicts a block diagram of a density map data structure 145, according to an embodiment of the invention. The density map 145 includes an entry or multiple entries corresponding to the region or regions associated with the display of objects on the screen of the output device 137. Each entry includes a region location 410, which may specify the location of the respective region on the output device 137 and a corresponding object density 420, which may indicate the density of displayed objects within the respective region. Density may be specified, e.g., in number of objects per screen area unit (region, square inch, square centimeter, pixels, or any other screen area unit). The controller 140 may create the density map 145 and the data in the region location 410 and the object density 420 as previously described above with reference to FIG. 3 and as further described below with reference to FIG. 5.

Figure 5:
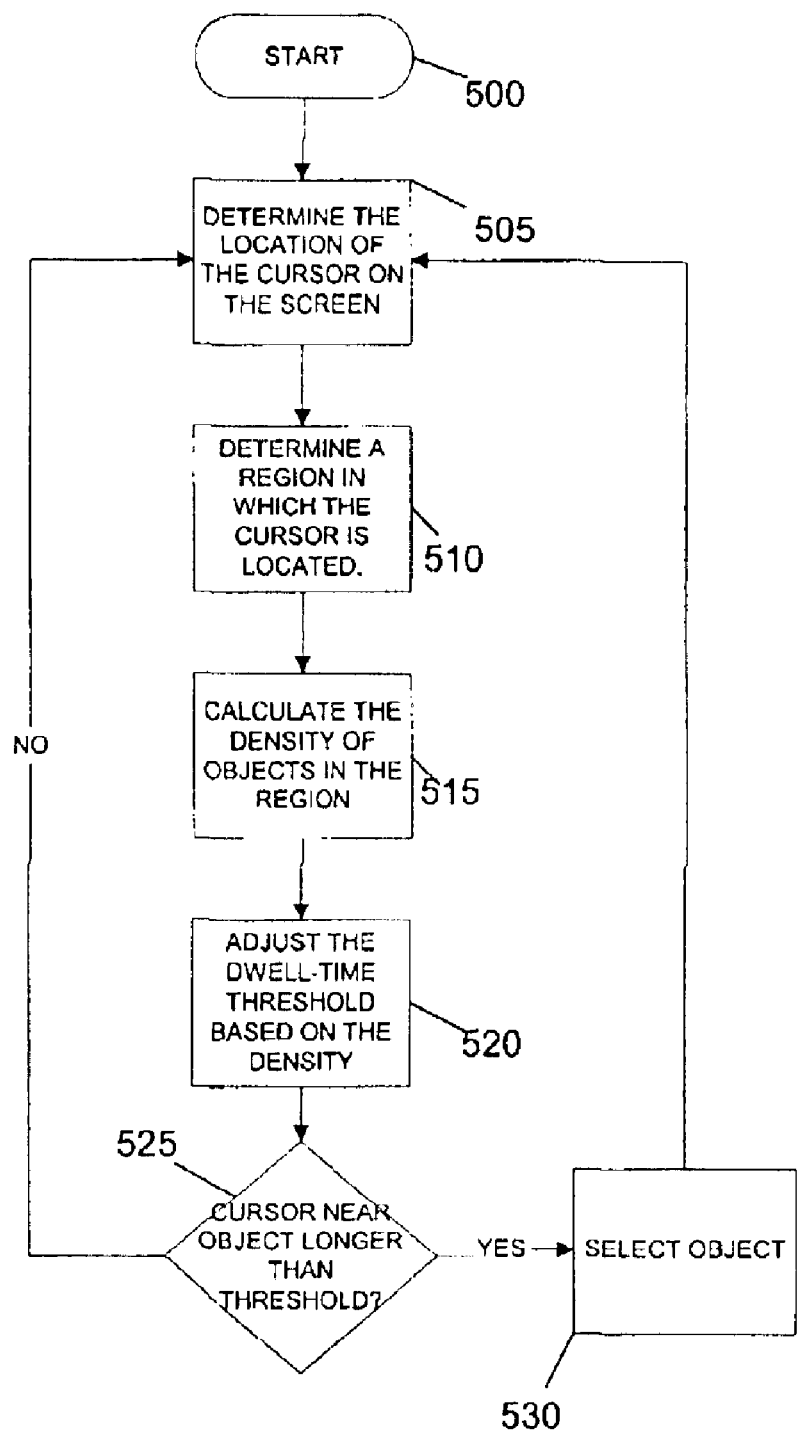
FIG. 5 depicts a flowchart of example processing, according to an embodiment of the invention.

FIG. 5 depicts a flowchart of example processing, according to an embodiment of the invention. Control begins at block 500. Control then continues to block 505 where the controller 140 determines the location of the cursor 290 on the screen of the output device 137. Control then continues to block 510 where the controller 140 determines a region in which the cursor 290 is located. Control then continues to block 515 where the controller 140 calculates the density of displayed objects in the determined region. In an embodiment, the controller may divide the screen of the output device 137 into regions and calculate the density for all displayed objects in all regions. In another embodiment where only one region exists that encompasses the cursor, as the cursor moves the controller 140 moves the encompassing region in a corresponding manner. The controller 140 may store information about the location of the region or regions and their densities in the density map 145.

Control then continues to block 520 where the controller 140 adjusts the dwell-time threshold based on the calculated density. When the region's density is relatively high, the controller 140 adjusts the dwell-time threshold to be relatively high. In contrast, when the region has a relatively low density, the controller 140 adjusts the dwell-time threshold to be relatively low. In an embodiment, the controller 140 adjusts the dwell-time threshold in direct proportion to the density, so that the dwell-time threshold is high when the density is high and the dwell-time threshold is low when the density is low. In an embodiment, a user may set a maximum and/or a minimum dwell-time threshold value. In an embodiment, when the region contains only one object, the controller 140 adjusts the dwell-time threshold to be the minimum dwell-time, and when the region contains directly adjacent objects, controller 140 adjusts the dwell-time threshold to be the maximum dwell-time.

Control then continues to block 525 where the controller 140 determines whether the cursor 290 is over an object or within a specified distance of an object for a time period longer than the dwell-time threshold. If the determination at block 525 is true, then control continues to block 530 where the controller 140 selects the object. Control then returns to block 505 as previously described above. If the determination at block 525 is false, then control continues directly to block 505 as previously described above.

What is claimed is:

1. A method comprising:
    determining a density of a plurality of objects displayed on a screen of an output device; and
    adjusting a dwell-time threshold for a pointing device based on the density.

2. The method of claim 1, wherein the adjusting further comprises:
    adjusting the dwell-time threshold in direct proportion to the density.

3. The method of claim 1, further comprising:
    determining a time period that a cursor associated with the pointing device is positioned within a specified distance of one of the plurality of objects; and
    comparing the time period to the dwell-time threshold.

4. The method of claim 3, further comprising:
    when the time period is greater than the dwell-time threshold, selecting the one of the plurality of objects.

5. The method of claim 1, wherein the determining the density further comprises:
    dividing the screen into a plurality of regions; and
    determining a number of the objects in one of the plurality of regions.

6. The method of claim 1, wherein the determining the density further comprises:
    determining a number of objects per unit area of the screen.

7. A signal-bearing medium bearing instructions that when executed by a processor comprise:
    determining a location of a cursor on a screen of an output device;
    determining a region around the location;
    determining a density of a plurality of objects within the region; and
    adjusting a dwell-time threshold for a pointing device based on the density of the plurality of objects within the region.

8. The signal-bearing medium of claim 7, wherein the adjusting further comprises:
    increasing the dwell-time threshold when the density has increased from a previous region.

9. The signal-bearing medium of claim 7, wherein the adjusting further comprises:
    decreasing the dwell-time threshold when the density has decreased from a previous region.

10. The signal-bearing medium of claim 7, wherein the adjusting further comprises:
    adjusting the dwell-time threshold in direct proportion to the density.

11. A signal-bearing medium encoded with a data structure accessed by a controller that executes on a computer, the data structure comprising a plurality of entries, each entry comprising:
    a location of a region on a screen of an output device; and
    a density of objects displayed within the region, wherein the controller is to adjust a dwell-time threshold for a pointing device based on the density.

12. The signal-bearing medium of claim 11, wherein the controller is to determine the location of the region based on a location of a cursor associated with the pointing device.

13. The signal-bearing medium of claim 11, wherein the controller is to determine the location of the region based on a number of total objects displayed on the screen.

14. The signal-bearing medium of claim 13, wherein the controller is to further determine the location of the region based on the size of the screen.

15. The signal-bearing medium of claim 11, wherein the controller is to determine the location of the region based on sizes of the objects.

16. A system comprising:
    a pointing device to indicate position information; and
    an electronic device comprising:
        a controller to display a cursor on a screen at a location corresponding to the position information and select a target object displayed on the screen when the cursor pauses at the target object for a time period longer than a dwell-time threshold, wherein the controller is further to adjust the dwell-time threshold based on a density of a plurality of objects displayed on the screen.

17. The system of claim 16, wherein the electronic device further comprises a receiver to receive the position information and transmit the position information to the controller.

18. The system of claim 17, wherein the receiver further comprises a camera.

19. The system of claim 16, wherein the pointing device further comprises a radio frequency transmitter to transmit the position information.

20. The system of claim 16, wherein the pointing device further comprises an infrared transmitter to transmit the position information.

21. The system of claim 16, wherein the pointing device further comprises reflective material to reflect light.

* * * * *